United States Patent Office.

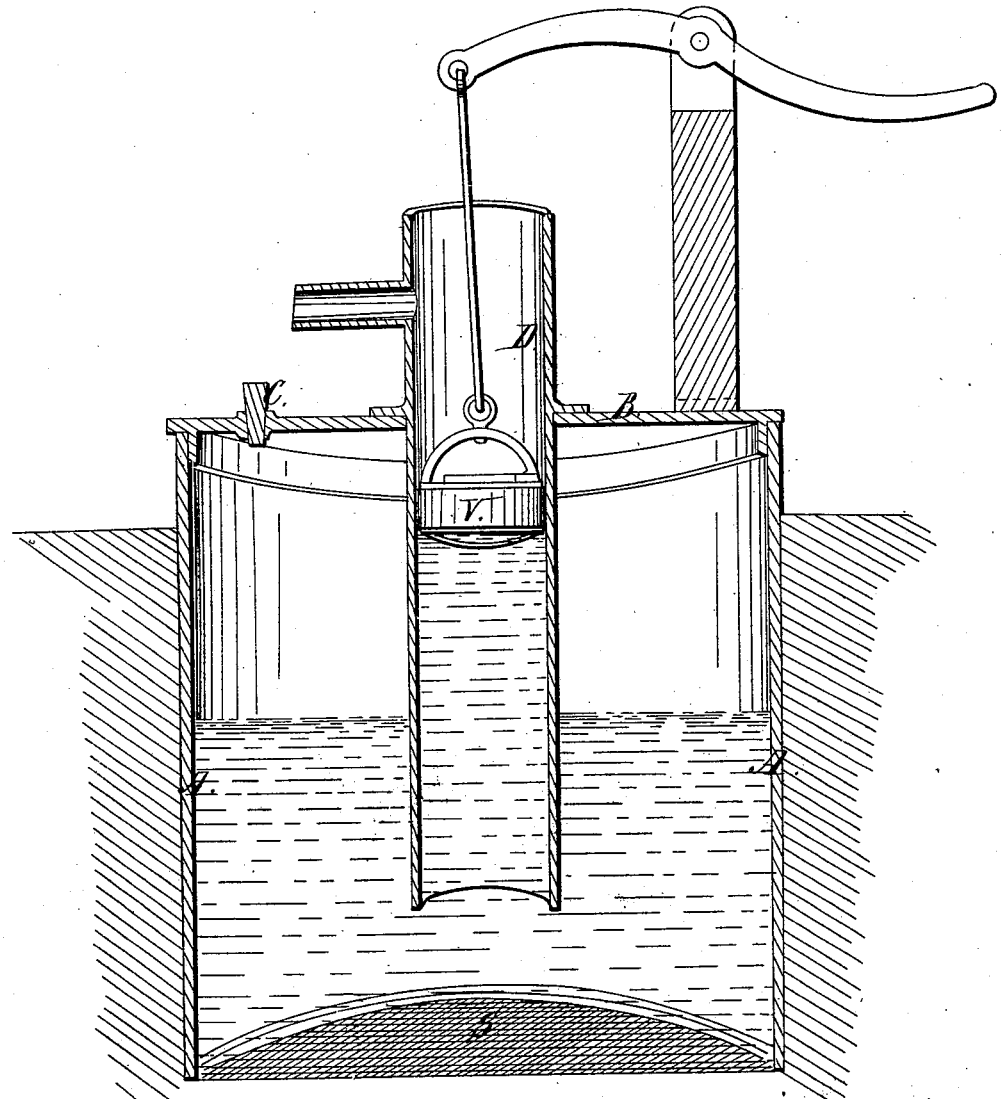

ENOCH NICKERSON, OF PROVINCETOWN, MASSACHUSETTS.

Letters Patent No. 71,044, dated November 19, 1867.

IMPROVEMENT IN COMBINED PUMP AND RESERVOIR.

The Schedule referred to in these Letters Patent and making part of the same.

Be it known that I, ENOCH NICKERSON, of Provincetown, in the county of Barnstable, and State of Massachusetts, have invented a new and improved Mode of Obtaining a Continuous Supply of Water, of which the following is a full, clear, and exact description, reference being had to the accompanying drawing, making a part of this specification, and representing a section of the apparatus employed in carrying out my invention.

The object of my invention is to obtain a supply of water from a shallow well or other cavity sunk in the ground, where the water is supplied by a spring, or gradually oozes into the said cavity, and is soon exhausted by the common means of raising the same; and the invention consists in sinking into the ground, where such spring or slow supply of water is found, a casing or tank of considerable diameter, and provided with a sieve or other reticulated or perforated material at its bottom, and made air-tight at its top and sides, in which is fitted a pump of ordinary construction, extending to a point not far from the bottom of the cavity, so that as the water is pumped up, the pressure of the atmosphere will overcome the tendency to a vacuum in the air-tight compartment, and thus maintain the water at or near its original level, by forcing a supply through the bottom of the tank.

My invention is designed more particularly to be applied in soils where water is usually found at a short distance below the surface, in which case it is usual to sink a barrel into a cavity in the ground, when the water will partially fill the same. A pump being fitted in the said barrel and operated, the water will ordinarily be soon exhausted, and after awhile will slowly ooze into the space again. When a large quantity of water is needed, especially in the event of a conflagration, the supply is very soon exhausted.

Referring to the drawing, A represents a circular casing or tank sunk in the ground sufficiently deep to allow a quantity of water to partially fill the same from the bottom. The bottom of the tank is provided with wire netting or other reticulated or perforated material, which serves to filter the water and prevent the sand or dirt from entering the tank. The top and sides of the tank are made air-tight; and fitting also air-tight in the top, is a pump, D, constructed and operating in the usual manner. As the water is pumped up and no air is admitted to the tank, a partial vacuum will ensue, and the water will consequently be forced up by the pressure of the atmosphere, through the bottom of the tank, and thus a continuous supply will be maintained. The apparatus may be applied to moist soils or springs wherever found, and used either for water or for oil. C is a plug which may be removed to allow the air to escape, and the water to rise, should the latter fall below the requisite level. The air may also be exhausted from the upper portion of the tank by means of an air-pump, if desirable.

Having thus described my invention, what I claim as new, and desire to secure by Letters Patent, is—

A tank or reservoir, A, made air-tight at its sides and top, and provided with a perforated bottom, in combination with a pump, D, as and for the purpose specified.

In testimony whereof I have signed my name to this specification in the presence of two subscribing witnesses.

ENOCH NICKERSON.

Witnesses:
   J. H. ADAMS,
   J. M. SCHROEDER.